United States Patent

Walser

[19]

[11] Patent Number: 6,031,984

[45] Date of Patent: Feb. 29, 2000

[54] METHOD AND APPARATUS FOR OPTIMIZING CONSTRAINT MODELS

[75] Inventor: Joachim P. Walser, Saarbrücken, Germany

[73] Assignee: i2 Technologies, Inc., Irving, Tex.

[21] Appl. No.: 09/036,903

[22] Filed: Mar. 9, 1998

[51] Int. Cl.[7] .................................................. G06F 9/455

[52] U.S. Cl. ............................. 395/500.23; 395/500.43; 395/708; 395/709; 706/13; 706/45

[58] Field of Search .............................. 395/500, 50, 81, 395/51, 500.23, 500.48, 500.43, 708, 709; 706/45, 13, 54; 364/164, 148.03, 153; 705/8

[56] References Cited

U.S. PATENT DOCUMENTS

| | | | |
|---|---|---|---|
| 5,267,346 | 11/1993 | Maruyama et al. | 395/10 |
| 5,343,388 | 8/1994 | Wedelin | 364/402 |
| 5,471,408 | 11/1995 | Takamoto et al. | 364/578 |
| 5,636,328 | 6/1997 | Kautz et al. | 395/50 |
| 5,640,491 | 6/1997 | Bhat et al. | 395/22 |
| 5,657,256 | 8/1997 | Swanson et al. | 364/580 |
| 5,781,432 | 7/1998 | Keeler et al. | 364/164 |
| 5,848,403 | 12/1998 | Gabrirner et al. | 706/13 |
| 5,855,009 | 12/1998 | Garcia et al. | 706/45 |

OTHER PUBLICATIONS

Fred Glover and Manuel Laguna. Tabu Search. In Colin R. Reeves, Editor, Modern Heuristic Techniques for Combinatorial Problems, chapter 3, pp. 70–150, Halsted Press, 1993.

Y.J. Jiang, H. Kautz, and B. Selman, Solving Problems with Hard and Soft Constraints Using a Stochastic Algorithm for MAX–SAT., In *Proceedings of the First International Joint Workshop on Artificial Intelligence and Operations Research*, 1995.

B. Selman, H.A. Kautz, and B. Choen. Local Search Strategies for Satisfiability Testing. Presented at *Second DIMACS Challenge on Cliques, Coloring, and Satisfiability*, Oct. 1993.

R. Aboudi and K. Jörnsten. Tabu Search for General Zero–One Integer Programs Using the Pivot and Complement Heuristic. *ORSA Journal on Computing*, 6(1):82–93, 1994.

B. Selman, H.A. Kautz, and B. Cohen. Noise Strategies for Improving Local Search. In *Proceedings AAAI–94*, pp. 337–343, 1994.

S. Minton, M.D. Johnston, A.B. Philips, and P. Laird. Minimizing Conflicts: A Heuristic Repair Method for Constraint Satisfaction and Scheduling Problems. *Artificial Intelligence*, 58: 161–205, 1992.

(List continued on next page.)

*Primary Examiner*—Kevin J. Teska
*Assistant Examiner*—Thai Phan
*Attorney, Agent, or Firm*—Baker & Botts, L.L.P.

[57] ABSTRACT

A computer implemented system (40) for optimizing a constraint model (52) includes a memory (46) for storing the constraint model (52). The constraint model (52) is an over-constrained system model that has constraints with variables. Each variable in the constraint model (52) is assigned a current value from a domain of the variable. A processor (42) generates a current assignment of each variable in the constraint model (52), selects a constraint from a set of unsatisfied constraints, selects at least one variable of the selected constraint, selects a new value for each selected variable, changes the value of each selected variable to its new value to generate a new assignment of variables, and stores the new assignment of variables as a best assignment in a set of one or more best assignments if it satisfies all the constraints and is at least as good as a best stored assignment. The processor (42) repeats the operations of selecting a constraint, a variable, and a new value, changing the value of each selected variable to its new value to generate a new assignment, and storing the new assignment until the new assignment satisfies all the constraints and is approximately optimal or until a specified number of iterations has been performed. In response, the processor (42) communicates at least one best stored assignment or communicates that no assignment satisfying all the constraints was found.

18 Claims, 2 Drawing Sheets

OTHER PUBLICATIONS

Egon Balas and C.H. Martin. Pivot and Complement—a Heuristic for 0–1 Programming. *Management Science*, 26:86–96, 1980.

J.-K. Hao and R. Dorne. Empirical Studies of Heuristic Local Search for Constraint Solving. In *Proceedings CP–96*, pp. 194–208, 1996.

B. Selman, H. Levesque, D. Mitchell. A New Method for Solving Hard Satisfiability Problems. In *Proceedings AAAI–92*, pp. 440–446, 1992.

J.P. Walser. Solving Linear Pseudo–Boolean Constraint Problems with Local Search. In *Proceedings AAAI–97*, 1997.

D. Abramson and M. Randall. A Simulated Annealing Code for General Integer Linear Programs. pp. 1–19, May 9, 1997.

M.B. Jampel. Over–Constrained Systems in CLP and CSP, Ph.D. Thesis, Department of Computer Science, City University, Sep. 19, 1996, pp. 1–156.

D. Connolly. General Purpose Simulated Annealing. J. Opl. Res. Soc., vol. 43, No. 5, pp. 495–505, 1992.

D. Abramson, H. Dang, and M. Krishnamoorthy. A Comparison of Two Methods for Solving 0–1 Integer Programs Using a General Purpose Simulated Annealing Algorithm. Annals of Operations Research 63 (1996), pp. 129–150.

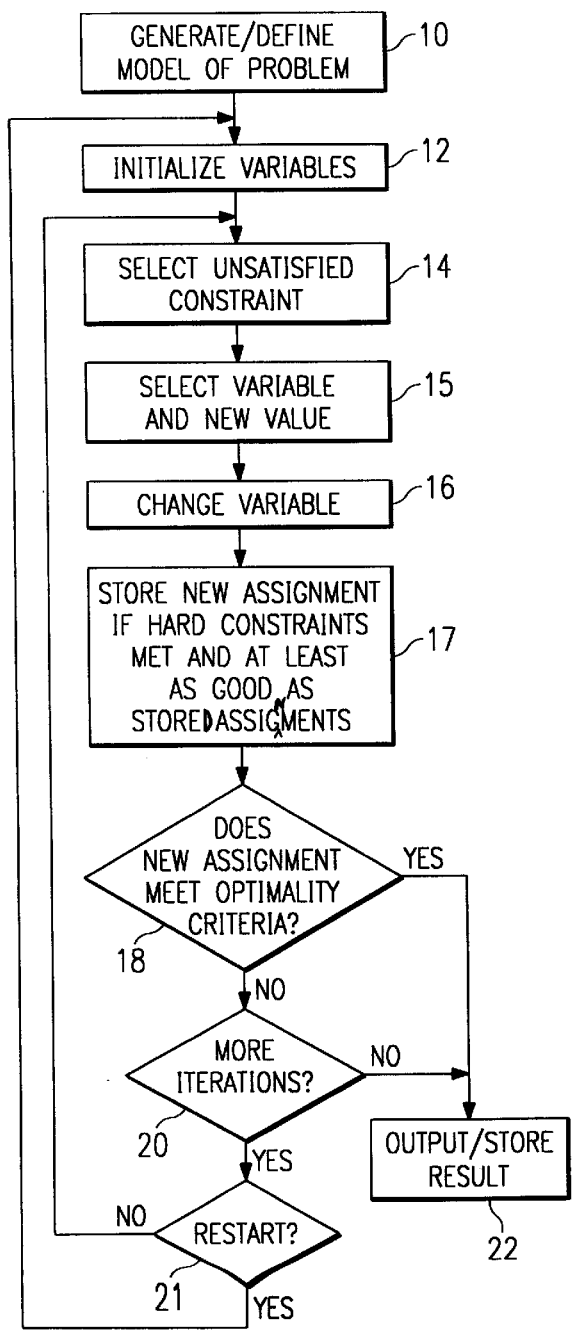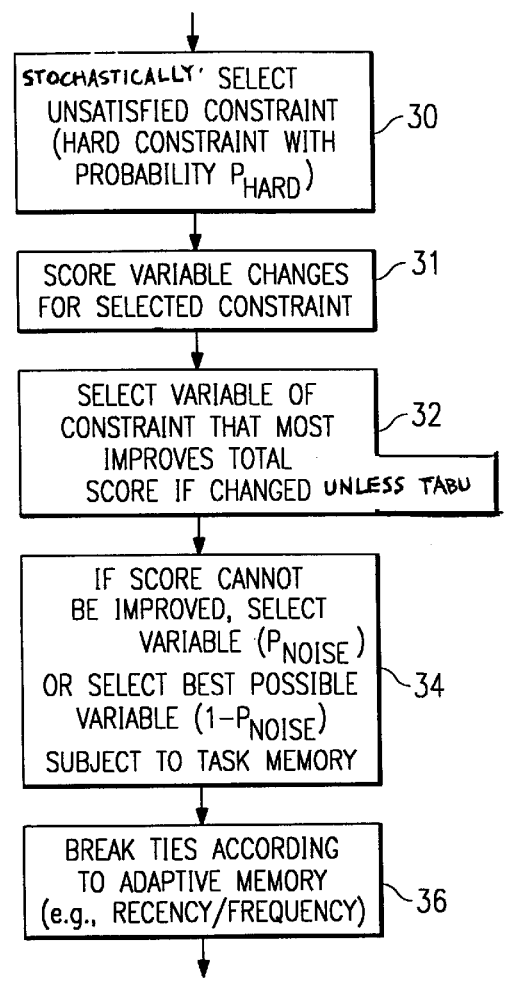

| PROBLEM MODEL | | | | | | |
|---|---|---|---|---|---|---|
| CONSTRAINTS | WEIGHT | TYPE | EXPRESSION | VARIABLES | BOOLEAN VALUES | FD INTEGER VALUES |
| a | 1 | SOFT | $(V_1 + V_2 + V_3 \geq 1)$ | $V_1$ | – | {10,20,50,100} |
| b | 10 | HARD | ⋮ | $V_2$ | {0,1} | – |
| c | 5 | HARD | | $V_3$ | {0,1} | – |
| d | 3 | SOFT | | ⋮ | ⋮ | ⋮ |
| ⋮ | ⋮ | ⋮ | | | | |

METHOD AND APPARATUS FOR OPTIMIZING CONSTRAINT MODELS

CROSS REFERENCE TO RELATED APPLICATIONS

This application is related to Disclosure Document No. 413,599, filed Jul. 14, 1997, and which is incorporated herein by reference.

TECHNICAL FIELD OF THE INVENTION

The present invention relates in general to the field of solving real-world constraint problems and, more particularly, to a method and apparatus for optimizing constraint models.

BACKGROUND OF THE INVENTION

Many practically relevant combinatorial optimization problems can be modeled using inequalities and equations over integer variables (integer programs). For example, such problems can include problems in the domains of time-tabling, resource allocation, production planning, or assignment. Efficient algorithms which are able to find high quality solutions for such optimization problems are of great importance for manufacturing, transportation, business and other fields.

Even though combinatorial optimization problems can often be formulated as integer programming (IP) models, not many general purpose techniques exist that can solve realistic instances if the problems are provided in such an algebraic specification. Conventional techniques for integer programming problems are (1) exact methods, (2) domain-specific heuristic methods and (3) domain-independent heuristic methods.

Exact general-purpose methods include (a) integer programming branch-and-bound and (b) logic-based methods. Branch-and-bound based techniques work by iteratively solving linear programming problems, embedded in a tree search which branches on variable values. Logic-based methods combine value propagation and other techniques to shrink the search space with branching. These techniques also search through the space of possible assignments by systematically examining a tree. State-of-the-art methods based on tree search typically exhibit difficulties with runtime as the problem size increases and often fail to find feasible solutions for large and tightly constrained problems.

Domain-specific heuristic methods provide techniques that are effective for hard optimization problems. However, most existing heuristics are tailored to specific problem domains. Such techniques typically excel in solving problems of one problem class (traveling salesman, bin-packing, graph-coloring, etc.) but lack the flexibility to handle additional side constraints. Domain-specific methods require implementation of program code for new problem domains and the adaptation of existing program code to incorporate side constraints.

Domain-independent heuristic methods include (a) meta-heuristics and (b) other domain-independent heuristics. Meta-heuristics (e.g., tabu search, genetic algorithms, simulated annealing, neural networks) express fundamental strategies for constraint solving and optimization. Meta-heuristics are meta methods and need to be implemented as program code (methods) for new problem domains to which they are applied (for specific problems they are instantiated as domain-specific heuristics). Implementing or adapting programs typically requires a considerable amount of man-power. Other domain-independent heuristic methods include tabu-search strategies for 0–1 integer problems based on mathematical programming techniques (pivot moves, probing or cutting plane generation) and are typically limited to inequalities and equation constraints and lack the flexibility to handle other constraint classes. Finally, simulated annealing based methods exist. Simulated annealing has been reported to perform less favorite in comparison with carefully engineered methods based on the GSAT algorithm for propositional satisfiability and MAXSAT problems.

One conventional technique is the Walksat process which is a domain-independent method for finding solutions to problems encoded in clauses of propositional logic (SAT). In SAT constraint satisfaction problems, constraints are disjunctions of literals. A set of constraints corresponds to a formula in conjunctive normal form (CNF), a conjunction of disjunctions. For example, in the constraint "A or (not B)", A and B are variables, and the constraint is a disjunction of literals "A" and "(not B)".

Many discrete combinatorial problems that can be represented as integer programs can not be concisely expressed as CNF constraints because of the large increase in the number of constraints and/or variables (the size increase per constraint is worst-case exponential in the number of variables in the constraint). Therefore, algorithms for SAT are not applicable to many optimization problems (problems from the domains assignment, capacitated production planning, resource allocation). Encoding practically relevant problems using SAT constraints would often require memory capacity not available in current microcomputers.

The following example illustrates the increase in size of the encoding if SAT constraints are used instead of pseudo-Boolean constraints. Consider, for example, a statement of a pigeonhole problem with boolean variables $p_{ij}$, where $p_{ij}$ means pigeon I is in hole j. A natural encoding is to use two different constraints, (a) every pigeon is in exactly one hole $$\Sigma_j p_{ij} = 1$$

(for all I), and (b) no two pigeons are in the same hole $$\Sigma_j p_{ij} \leq 1$$

(for all j). Given n pigeons and m holes, this formulation consists of n+m pseudo-boolean constraints.

On the other hand, a SAT encoding would be (a) $V_j p_{ij}$ (for all I) and $$\forall j \forall k \neq j : p_{ij} \rightarrow \overline{p_{ik}}$$

(for all I); similarly for (b). With $O(m^2n+n^2m)$ constraints, the size of this SAT encoding would be impractical for larger instances. Coefficients in the sums can make the size increase even more problematic.

SUMMARY OF THE INVENTION

In accordance with the present invention, a method and apparatus for optimizing constraint models are disclosed that provide advantages over prior methods.

According to one aspect of the present invention, a computer implemented method and apparatus optimize a constraint model and provide an approximately optimal solution to a user where the constraint model is an over-constrained system model having hard and soft constraints and variables and wherein the domain of each variable is a finite set of values which can include integers. An initial assignment of variables in the constraint model is generated where each variable is assigned a value from a domain of the variable. Then, at least one constraint is stochastically selected from a set of unsatisfied constraints. Using an adaptive memory, at least one variable is selected from each selected constraint, and, for the selected variable, a new value is selected from the domain of the variable. The value of the selected variable is changed to the new value thereby changing the current assignment of variables and updating the adaptive memory. The current assignment of variables is stored in memory if the current assignment satisfies all the hard constraints and is judged at least as good as a best currently stored assignment. The steps of selecting at least one constraint, at least one variable and a new value, changing a value, and storing the current assignment are repeated until an assignment is found that satisfies all the hard constraints and is approximately optimal or until a specified number of iterations has been performed. The best assignments or an indication that no assignment satisfying all the hard constraints was found are then provided to the user.

An object of the present invention is to provide a flexible means to efficiently solve a variety of combinatorial optimization problems, using a general-purpose heuristic. In practice such general-purpose methods are indispensable as there is often not enough time and expertise to implement and customize new heuristics for every new problem class and its particularities. Of course, domain-specific heuristics can be tailored to specific domains and can achieve better performance than general-purpose techniques. However, implementing efficient domain-specific methods typically requires considerable effort in research and development which is not required if a general-purpose method is applied.

A technical advantage of the present invention is the generalization of the prior WSAT process to over-constrained systems such as over-constrained integer programs and, as a special case, over-constrained pseudo-Boolean systems. Further, the present invention provides an extended and improved variable selection strategy for how variables are selected for complementing or changing.

Another technical advantage of the present invention is a general purpose local search method for optimization of over-constrained systems. The present invention can solve, for example, hard 0–1 constraint/optimization problems that are not solvable by prior domain-independent methods (e.g. ILOG Solver or CPLEX).

Further, the present invention provides an ability to approximately solve a variety of large and tightly constrained integer optimization problems efficiently, while on the other hand being a conceptually simple strategy. Currently, most of the applications considered in case studies have been 0–1 integer problems. In some cases a comparison with a commercial IP branch-and-bound solver (CPLEX 4.0) showed a significant improvement in scaling of runtimes with increasing problem size (a speedup of orders of magnitude on realistic examples from radar surveillance). In one case, the present method (sometimes referred to as WSAT(OIP)) proved substantially more robust in finding (close-to-optimal) feasible solutions quickly (e.g., capacitated production planning). In another case, for two tightly constrained feasibility problems that were beyond the capabilities of IP branch-and-bound, the present method was still able to find feasible solutions quickly (e.g., Scheduling of the ACC Basketball League and the "Progressive Party Problem")

Additional technical advantages should be apparent from the drawings, description and claims.

BRIEF DESCRIPTION OF THE DRAWINGS

FIG. 1 is a flow chart of one embodiment of a method for optimizing an over-constrained system represented by a constraint model according to the present invention;

FIG. 2 is a flow chart of one embodiment of variable value selection for the method of FIG. 1 according to the present invention;

DETAILED DESCRIPTION OF THE INVENTION

Figures 3, 4:
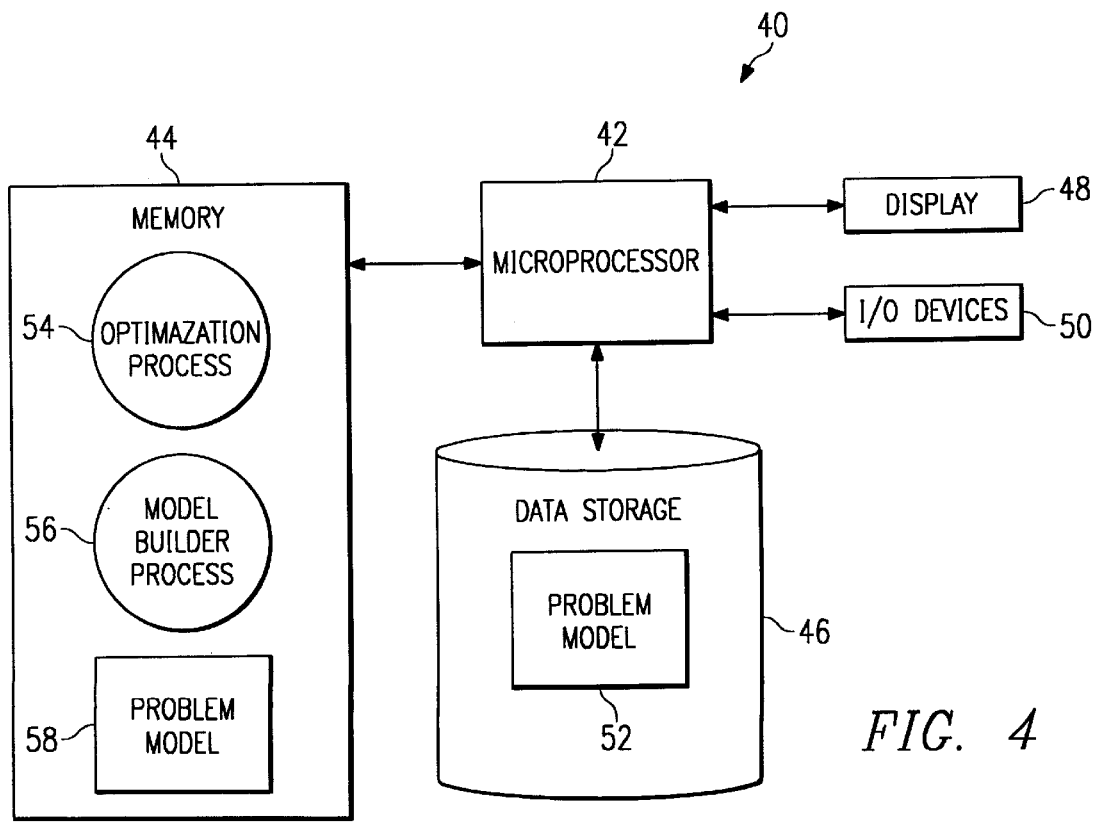
FIG. 3 is a chart illustrating one embodiment of a constraint model of an over-constrained system according to the present invention.
FIG. 4 is a block diagram of one embodiment of an apparatus for optimizing a constraint model of an over-constrained system according to the present invention.

For optimization problems, it is often necessary to encode optimization objectives, which is traditionally achieved using objective functions as in classical integer programming models. The present invention takes a different approach by using over-constrained systems to model optimization problems. Over-constrained systems are constraint systems in which the constraints are ranked or classified as "hard" or "soft" constraints, in order to encode systems for which satisfying all constraints is not possible. In solutions to an over-constrained system, all hard constraints are required to be satisfied, while soft constraints may be violated at a certain cost. Soft constraints can thus be used to encode objective functions. A system of hard and soft pseudo-Boolean constraints is referred to herein as an "over-constrained pseudo-Boolean system". Analogously, a system is referred to as an "over-constrained integer program" if all constraints are equations and inequalities over integer variables of the form:

$$m{:}f(x_1, \ldots x_n) \sim d$$

where f is a polynomial function in integer variables $x_1, \ldots, x_n$, d is a real-valued number, $\sim$ is a relational operator $\sim \in \{=, <, \leq, \geq, \geq\}$, and m$\in$ \{hard, soft\} is a marker to distinguish hard and soft constraints.

The method and apparatus of the present invention generalize the conventional Walksat procedure to more expressive classes of over-constrained systems. The present invention allows, but is not limited to, the encoding of optimization objectives by soft constraints in the form of over-constrained integer programs. Further, the present invention, as a special case, allows encoding pseudo-Boolean constraints (0–1 integer programs). With respect to pseudo-Boolean constraints, certain aspects of the present method have been presented as the WSAT(PB) algorithm in J.P. Walser, "Solving linear pseudo-Boolean constraint problems with local search," Proceedings AAAI-97, 1997, the disclosure of which is incorporated herein by reference.

In general, the present method and apparatus involve a local-search technique that works by changing variable values in order to arrive at a solution (approximately optimal variable assignment) to the problem constraints. In particular, the present invention provides advantages by generalizing the WSAT algorithm to over-constrained systems and by providing a carefully engineered method for selecting variables to be changed (variable-selection strategy). An important characteristic of the invention is the use of adaptive memory in the optimization process. Adaptive memory is employed in the form of I) a tabu mechanism, ii) recency-based tie breaking and iii) frequency based tie breaking, based on the recorded variable changes. The adaptive memory component has proven to be a critical enhancement of the algorithm for solving difficult or large structured problems in many computational experiments.

Successful applications of the method of the present invention have been studied in a number of case studies and have partly been reported. Solutions for diverse problem domains have been studied, such as: radar surveillance (covering-type problems, minimizing overall cell over-coverage), student course placement maximizing accumulated preferences (assignment), basketball scheduling (9-teams double round-robin of the Atlantic Coast Conference), a case study on the "Progressive-Party Problem" (a hard scheduling-type problem studied in the CSP literature), and capacitated lot-sizing (in production planning). In all of the above case studies, the present method significantly outperforms previous methods in terms of both solution quality, runtime and robustness. For several constraint problems (e.g., the Progressive Party and ACC scheduling problems), the present invention appears to be the first method that can robustly find solutions of approximately optimal quality directly from the given integer constraints.

Over-Constrained Integer Programs

FIG. 1 is a flow chart of one embodiment of a method for optimizing an over-constrained system represented by a constraint model according to the present invention. Typically, this method is computer implemented using an apparatus as shown, for example, in FIG. 4. In step 10 of FIG. 1, a problem model representing an over-constrained system is defined by the user or is generated using input from the user. According to the present invention, the over-constrained system is modeled using a constraint model. The over-constrained system can include, for example, over-constrained integer programs and, as a special case thereof, over-constrained pseudo-Boolean systems. Additionally, over-constrained systems may include disequality, or distance constraints: for example, the constraint "soft: $|x-y| \geq 3$" requires the distance of the variables x and y to be at least 3 and adds a penalty to the score if the distance is less (to be used, for example, in frequency allocation applications). Generally, over-constrained systems may also include hard and soft symbolic constraints as used in constraint programming systems: for example, the constraint "all-different $[x_1, \ldots, x_{10}]$" requires that the values of variables $x_1, \ldots, x_{10}$ all be different.

Generally, in step 12, an initial assignment of all of the variables is made for the problem model. In one implementation, the initial assignment is chosen by a biased stochastic function. For example, for a Boolean variable, a variable can be assigned "0" with probability $p_z$ and a "1" with probability $1-p_z$. This type of initial assignment can help reduce the number of initially violated constraints. Alternatively, the method could be applied as a Lagrangean heuristic where the initial variable values are the result of Lagrangean decomposition.

After the variables are initialized, the method iterates through a local search process to generate an approximately optimal solution to the over-constrained system. In step 14, an unsatisfied constraint is selected. A variable and new value is then selected from the selected constraint in step 15. In step 16, the selected variable is changed to the new value. One implementation of steps 14, 15 and 16 is shown in and described with respect to FIG. 2. After the variable is changed in step 16, the new variable assignment is stored, in step 17, if all of the hard constraints are met, and the new assignment is at least as good as the best already stored assignment. In step 18, the new assignment is checked to determine whether it meets defined optimality criteria. For example, the assignment can be judged approximately optimal if it achieves a defined score. If the assignment does not meet the optimality criteria, then the number of iterations is checked in step 20. If the limit has not been met, then the method checks, in step 21, whether there should be a restart. If so, the method continues at step 12 with a re-initialization of the variables. If not, the method continues at step 14 to repeat the variable selection cycle. After the iteration limit is met or an approximately optimal solution is found, the method continues at step 22 and stores and outputs the resulting assignment or indicates that no approximately optimal assignment was identified.

For operational reasons, the present method uses as input over-constrained integer programs which are a constraint class that is closely related to integer programs (IPs). As has been mentioned above, systems of hard and soft constraints (inequality and equation relations) over functions of integer variables are referred to herein as over-constrained integer programs (OIPs). Over-constrained IPs are a variation of classical integer programs in which the objective function is represented by a set of soft constraints.

For the special case where all constraints (hard and soft) are linear inequalities/equations, the problem model can be denoted in matrix notation by:

$$Ax \geq b$$

$$Cx \leq d \text{ (soft)}$$

$$x \in D_1 \times \ldots \times D_n.$$

Here, A and C are real valued coefficient matrices, b and d are real-valued vectors, and x is the variable vector. Each variable domain $D_i$ is a finite set of numbers. The objective for this problem model is to minimize some measure of the overall violation of soft constraints, subject to the set of hard constraints. Problems in the form set forth above are referred herein as being in "min normal form". Most minimization problem can be converted into min normal form by multiplying every incorrectly directed inequality (e.g., $\leq$ instead of $\geq$) by $-1$ and by converting every equality into two inequalities. However, input to the present method is not required to be in min-normal form, but can be any set of linear inequalities/equations over integer variables. Min normal form is used as an example in order to more clearly explain the present invention.

Given a specific evaluation function $\|.\|$ to measure the overall violation of soft constraints (as a means for determining optimization), the above equations can be interpreted as the following optimization problem.

$$\text{minimize} \|Cx - d\|$$

$$\text{subject to } Ax \geq b$$

$$x \in D_1 \times \ldots \times D_n.$$

The present method (referred to as WSAT(OIP)) assumes as input over-constrained integer programs. This method is a generalization of WSAT(PB) (see reference above), which is a local search method for linear pseudo-Boolean constraints and, itself generalizes "Walksat", a method for model finding in satisfiability (SAT).

Variable Selection Cycle

Abstractly, the strategy of the present method is to start with some initial variable assignment and select individual variable/value pairs to be changed in a stream $(v_1 a_1), (v_2 a_2), (v_3, a_3) \ldots$ according to the method shown in FIG. 1. Variables are selected in a two-stage process of selecting an unsatisfied constraint for repair (hard or soft) (step 14) and selecting a variable to be changed (step 15), such that the violation of the selected constraint is reduced. If a variable is Boolean, a change consists of flipping that variable (complementing its assignment), finite domain variables are triggered to smaller or greater values. Occasionally, a restart (step 21) with a new initial assignment takes place to escape from local minima, for example, after a fixed number of moves or dynamically determined according to the performance of the search.

To describe one implementation of the variable and value selection strategy for over-constrained IPs in more detail, the notion of "score" is introduced which the present method uses to perform hill-climbing. Given a particular assignment x, one score used by the present method to evaluate a system of the min normal form shown above is defined as:

$$\text{score } (x) = \|b - Ax\|_\lambda + \|Cx - d\|$$

In the above equation, an evaluation function $\|.\|$ is used by the present method which evaluates each violated constraint in proportion to its degree of violation and is defined as:

$$\|x\| := i: \Sigma_i \max(0, x_i)$$

Additionally, the score computation above uses a vector $\lambda \geq 0$ of constraint weights (similar to Lagrange-multipliers), which is used in computing the score $$\|x\|_\lambda := \Sigma_i \max(0, \lambda_i x_i)$$

Constraint weights $\lambda_i$ can be statically assigned or dynamically updated during the search. It has been shown by others that dynamic constraint-weights can improve the search process on structured problems in local search for satisfiability problems.

There are of course many alternative ways to define the score. The above implementation of the present method employs the score definition shown above because of its simplicity and good empirical performance in many cases. Furthermore, the above score definition has the characteristic that the score of every feasible solution is exactly its objective value, since $\|b-Ax\|=0$ for every feasible solution. For pure feasibility problems, the score of every solution is zero.

Variable Value Selection

FIG. 2 is a flow chart of one embodiment of variable value selection for the method of FIG. 1 according to the present invention. This variable selection method is carefully engineered to solve hard real-world constraint and optimization problems and is capable of handling over-constrained systems with hard and soft constraints. The remaining degrees of freedom for a local search method are (i) how to choose a variable from a selected constraint and (ii) how to select a new value. As has been noted for SAT local search, the details of the variable selection are critical for performance. A fundamental principle behind the present method is greediness: select local moves that most improve the total score. Additionally, adaptive memory and noise are employed to overcome local minima.

As shown in FIG. 2, in step 30, an unsatisfied constraint a is stochastically selected. In this step, with probability $P_{HARD}$, a hard constraint is selected, and with a probability $1-P_{HARD}$, a soft constraint is selected. Then, in step 31, variable changes are scored for the selected constraints $\alpha$. In this step, from $\alpha$, all variables are scored which can be changed such that $\alpha$'s score is improved. For each such variable, one or more values from its domain are selected, and, for each value, the new total score of the altered current assignment is computed (after changing the variable value). Changing variables is accomplished by flipping Boolean variables and by triggering up or down the value of finite domain variables. In step 32, the variable-value pair is selected that most improves the total score, if the variable is changed to the new value. In step 34, if the score cannot be improved, then a stochastic improving variable-value combination is selected with probability $P_{NOISE}$, and the best possible variable-value pair is selected with a probability $1-P_{NOISE}$. In step 34, variable-value pairs that have just been assigned are tabu. Further, in step 36, ties are broken according to an adaptive memory such as according to (i) frequency and (ii) recency.

It should be understood that many possible variants of this scheme are possible. The described strategy includes a tabu mechanism with tenure of size t: no variable-value pair may be assigned that has been assigned in the previous t moves, and no Boolean variable may be flipped that has been flipped in the previous t moves. Further, in the equations shown below, all ties between otherwise equivalent variable-value pairs are broken by an adaptive memory history mechanism that employs both frequency and recency information: on ties, the history mechanism chooses the move that was chosen i) least frequently, and on ties ii) longest ago.

Objective Functions

Thus far, constraint models have been considered with the objective to minimize a measure of the violation of soft constraints subject to a set of hard constraints. However, explicit minimization or maximization objective functions are sometimes needed as part of the model. Therefore, the present method can allow objective functions to be associated with over-constrained integer programs in a straightforward way. If the objective is to minimize a set of linear functions, it can be represented as follows:

$$\text{minimize} |Mx|$$
$$\text{subject to } Ax \geq b$$
$$Cx \leq d \text{ (soft)}$$
$$x \in D_1 \times \ldots \times D_n.$$

Here, $|.|$ is the elementwise sum of the vector elements. This system can be interpreted as:

$$\text{minimize} \|Cx - d\| + |Mx|$$
$$\text{subject to } Ax \geq b$$
$$x \in D_1 \times \ldots \times D_n.$$

Maximization objective functions can be formulated similarly by converting the maximization functions to minimization functions and negating the respective coefficients.

FIG. 3 is a chart illustrating one embodiment of a constraint model of an over-constrained system according to the present invention. As shown in FIG. 3, a problem model can be defined by a plurality of constraints (a,b,c,d, ...). Each constraint can have an associated weight representing its importance, as well as can be a hard or soft constraint. Each constraint is defined by an expression (e.g., $V_1+V_2+V_3 \geq 1$). As shown, the variables have integer domains, such as Boolean domains and finite domain (FD) integer value domains. Extending the model to handle constraints with different relational operators, coefficients, and addition instead of disjunction incurs only a relatively small overhead over the propositional case.

FIG. 4 is a block diagram of one embodiment of an apparatus, indicated generally at 40, for optimizing a constraint model of an over-constrained system according to the present invention. Apparatus 40 can be a personal computer, computer workstation or other suitable computing device.

over-coverage found in 30K, 100K, 300K, and 500K changes respectively (averaged over 20 runs), and the "time" gives the average time needed in seconds. "Best" measures the best over-coverage found within all 20 runs. The "oc*" column gives optimal over-coverage (integer). The columns for CPLEX include "best" which is the best over-coverage found within 12 hours and "time" which is the runtime. All runtimes were measured on a SPARCstation 20.

| Size | n | m | spread | % sig | LP lb | oc* | Present Method | | | CPLEX | |
|---|---|---|---|---|---|---|---|---|---|---|---|
| 100:22 | 434 | 606 | even | 100 | 0 | 0 | opt | 0.0 | 0.1 | opt | 1.0 |
| 200:44 | 933 | 1273 | even | 100 | 1 | 1 | opt | 1.0 | 4.0 | opt | 25.9 |
| 900:200 | 4616 | 6203 | even | 100 | 2 | 2 | opt | 2.0 | 23.6 | opt | 1654.8 |
| 2100:467 | 10975 | 14644 | even | 100 | 3 | 3 | opt | 3.0 | 43.9 | 7 | 12 h |
| 100:22 | 410 | 581 | even | 98 | 1 | 1 | opt | 1.0 | 1.0 | opt | 1.0 |
| 200:44 | 905 | 1246 | even | 98 | 2 | 2 | opt | 2.0 | 3.5 | opt | 25.5 |
| 900:200 | 4623 | 6174 | even | 98 | 4 | 4 | opt | 5.0 | 26.1 | opt | 2376.8 |
| 2100:467 | 10989 | 14595 | even | 98 | 11.5 | 12 | opt | 14.6 | 55.8 | 13 | 12 h |
| 100:22 | 371 | 518 | uneven | 100 | 3 | 3 | opt | 3.0 | 0.8 | opt | .5 |
| 200:44 | 772 | 1065 | uneven | 100 | 0 | 0 | opt | 0.0 | 0.1 | opt | 16.9 |
| 900:200 | 4446 | 5699 | uneven | 100 | 5 | 5 | opt | 5.0 | 21.7 | opt | 2916.7 |
| 2100:467 | 10771 | 14002 | uneven | 100 | 8.1 | 9 | 10 | 10.7 | 48.4 | 33 | 12 h |

As shown, apparatus 40 includes a processor 42, memory 44, data storage 46, display 48 and I/O devices 50. Apparatus 40 could include other computer components as well. Data storage 46 stores data representing a problem model 52 that defines an over-constrained system using constraints according to the present invention. An optimization process 54 stored in memory 44 and executed by processor 42 directs apparatus 40 to perform the optimization method of the present invention using problem model 52. Problem model 52 can be defined directly by a user, or can be built interactively using a model builder process 56. Further, a problem model 58 instance can be stored in memory 44 and used by optimization process 54 rather than needing to access data storage 46. When an approximately optimal result is identified by optimization process 54, the result can be stored as data on data storage 46 as well as output to display 48 or to I/O devices 50.

Although the present invention has been described in detail, it should be understood that various changes, substitutions and alterations can be made thereto without departing from the sphere and scope of the invention as defined by the appended claims.

APPENDIX

This appendix provides results on experimental results for a radar surveillance problem. CPLEX 4.0 was run with standard parameter settings but using a "diving" primal heuristic and limiting runtime to 12 hours. The present method was run with a variable selection heuristic that only allowed for choosing variables that will improve the score of selected constraints and additional tabu aspiration based on the total score. The results of the comparison on the radar surveillance problem are shown in the following table. Columns in the table include the problem size in number of cells and stations (stations have a maximal reach of $d_{max}=4$). The second column is the encoding size in number of variables n and constraints m. The next three columns are the spread of stations on the map, percentage of significant cells, and LP lower bound for over-coverage. In the comparison, columns for the present method include "fast" measures best

What is claimed is:

1. A computer implemented method for optimizing a constraint model and communicating an approximately optimal solution, comprising:
   generating a current assignment of each variable in the constraint model, wherein:
      the constraint model is an over-constrained system model having one or more constraints, each having one or more variables;
      the constraints are selected from the group consisting of linear equations, linear inequalities, linear disequalities, and distance constraints; and
      each variable in the constraint model is assigned a current value from a domain of the variable;
   selecting a constraint from a set of unsatisfied constraints;
   selecting at least one variable of the selected constraint;
   selecting, for each selected variable, a new value from the domain of the variable;
   changing the value of each selected variable to its new value to generate a new assignment of variables, in which each variable in the constraint model has either its current value or its new value;
   storing the new assignment of variables as a best assignment in a set of one or more best assignments if it satisfies all the constraints and is at least as good as a best stored assignment;
   repeating the steps of selecting a constraint, at least one variable of the selected constraint, and a new value for each selected variable, changing the value of each selected variable to its new value to generate a new assignment, and storing the new assignment until the new assignment satisfies all the constraints and is approximately optimal or until a specified number of iterations has been performed; and
   in response, communicating at least one best stored assignment or communicating that no assignment satisfying all the constraints was found.

2. The method of claim 1, wherein each constraint is selected from the group consisting of linear inequalities and linear equations, and the domain is a finite set of values.

3. The method of claim 1, wherein the constraint model has associated one or more objective functions that are:

optimized in the steps of selecting a constraint, selecting at least one variable of the selected constraint, selecting a new value for each selected variable, and changing the value of each selected variable to its new value to generate a new assignment; and used in determining whether to store the new assignment of variables.

4. The method of claim 1, wherein an adaptive memory is used in selecting at least one variable of the selected constraint and selecting a new value for each selected variable, the adaptive memory comprising:

a tabu mechanism that prevents variable changes in the current assignment from returning to variable values in at least some previous assignments; and a memory of prior value changes.

5. The method of claim 4, wherein selecting at least one variable of the selected constraint and selecting a new value for each selected variable comprise:

altering, for one or more variables of the selected constraint, the current values of the variables to generate an altered current assignment;

computing a score for the altered current assignment;

ranking the scores for one or more altered current assignments; and selecting the variable and the new value for each selected variable according to the ranking.

6. The method of claim 5, wherein altering the current value of a variable further comprises changing its value to another value from the domain of the variable to improve the score of the current assignment.

7. The method of claim 5, wherein the step of selecting a constraint from a set of unsatisfied constraints comprises distinguishing between one or more hard constraints and one or more soft constraints and selecting at least one hard constraint according to a parameter $P_{HARD}$.

8. The method of claim 4, wherein the current assignment is generated using a technique for Lagrangean relaxation.

9. The method of claim 1, further comprising repetitively applying a genetic algorithm to an existing population of variable assignments to effect recombination and mutation of members of the existing population chosen on the basis of scores for the corresponding current assignments and to thereby modify the population.

10. A computer implemented system for optimizing a constraint model and communicating an approximately optimal solution, comprising:

a memory operable to store the constraint model, wherein:
the constraint model is an over-constrained system model having one or more constraints, each having one or more variables;
the constraints are selected from the group consisting of linear equations, linear inequalities, linear disequalities, and distance constraints; and
each variable in the constraint model is assigned a current value from a domain of the variable; and a processor coupled to the memory device and operable to:
generate a current assignment of each variable in the constraint model;
select a constraint from a set of unsatisfied constraints;
select at least one variable of the selected constraint;
select, for each selected variable, a new value from the domain of the variable;
change the value of each selected variable to its new value to generate a new assignment of variables, in which each variable in the constraint model has either its current value or its new value;
store the new assignment of variables as a best assignment in a set of one or more best assignments if it satisfies all the constraints and is at least as good as a best stored assignment;
repeat the operations of selecting a constraint, at least one variable of the selected constraint, and a new value for each selected variable, changing the value of each selected variable to its new value to generate a new assignment, and storing the new assignment until the new assignment satisfies all the constraints and is approximately optimal or until a specified number of iterations has been performed; and
in response, communicate at least one best stored assignment or communicate that no assignment satisfying all the constraints was found.

11. The system of claim 10, wherein each constraint is selected from the group consisting of linear inequalities and linear equations, and the domain is a finite set of values.

12. The system of claim 10, wherein the constraint model has associated one or more objective functions that are:

optimized in selecting a constraint, selecting at least one variable of the selected constraint, selecting a new value for each selected variable, and changing the value of each selected variable to its new value to generate a new assignment; and used in determining whether to store the new assignment of variables.

13. The system of claim 10, wherein an adaptive memory is used in selecting at least one variable of the selected constraint and selecting a new value for each selected variable, the adaptive memory comprising:

a tabu mechanism that prevents variable changes in the current assignment from returning to variable values in at least some previous assignments; and a memory of prior value changes.

14. The system of claim 13, wherein selecting at least one variable of the selected constraint and selecting a new value for each selected variable comprise:

altering, for one or more variables of the selected constraint, the current values of the variables to generate an altered current assignment;

computing a score for the altered current assignment;

ranking the scores for one or more altered current assignments; and selecting the variable and the new value for each selected variable according to the ranking.

15. The system of claim 14, wherein altering the current value of a variable further comprises changing its value to another value from the domain of the variable to improve the score of the current assignment.

16. The system of claim 14, wherein selecting a constraint from a set of unsatisfied constraints comprises distinguishing between one or more hard constraints and one or more soft constraints and selecting at least one hard constraint according to a parameter $P_{HARD}$.

17. The system of claim 13, wherein the current assignment is generated using a technique for Lagrangean relaxation.

18. The system of claim 10, wherein the apparatus further operates to repetitively apply a genetic algorithm to an existing population of variable assignments to effect recombination and mutation of members of the existing population chosen on the basis of scores for the corresponding current assignments and to thereby modify the population.

* * * * *

UNITED STATES PATENT AND TRADEMARK OFFICE
CERTIFICATE OF CORRECTION

PATENT NO. : 6,031,984
DATED : February 29, 2000
INVENTOR(S) : Joachim P. Walser It is certified that error appears in the above-identified patent and that said Letters Patent is hereby corrected as shown below:

Title page,
[73], please delete "Assignee: i2 Technologies, Inc., Irving, Tex."

Signed and Sealed this

Fourteenth Day of August, 2001

Attest:

*Attesting Officer*

NICHOLAS P. GODICI
*Acting Director of the United States Patent and Trademark Office*